United States Patent [19]

Christensen et al.

[11] 4,406,811
[45] Sep. 27, 1983

[54] COMPOSITION AND METHOD FOR CONTROLLING CORROSION IN AQUEOUS SYSTEMS

[75] Inventors: Ronald Christensen, Westmont; Audrone Gelazis, Chicago, both of Ill.

[73] Assignee: Nalco Chemical Company, Oak Brook, Ill.

[21] Appl. No.: 112,431

[22] Filed: Jan. 16, 1980

[51] Int. Cl.$^3$ .............................................. C02F 5/10
[52] U.S. Cl. ............................... 252/180; 252/389 A; 252/390; 252/391; 252/392; 422/15; 422/16; 422/17; 106/14.12; 106/14.13; 106/14.15; 210/749
[58] Field of Search .................. 252/389 A, 396, 390, 252/392, 175, 180, 80, 391, 82; 422/15, 17, 16; 106/14.05, 14.12, 14.13, 14.16, 14.15; 210/58, 59, 60

[56] References Cited

U.S. PATENT DOCUMENTS

| | | | |
|---|---|---|---|
| 3,696,048 | 10/1972 | Hausler et al. | 252/396 |
| 3,981,682 | 9/1976 | Ward et al. | 252/396 |
| 4,101,441 | 7/1978 | Hwa et al. | 252/389 A |
| 4,138,353 | 2/1979 | Lipinski | 252/181 |
| 4,149,969 | 4/1979 | Robitaille et al. | 252/181 |
| 4,176,059 | 11/1979 | Suzuki | 252/389 A |
| 4,219,433 | 8/1980 | Manabe et al. | 252/389 A |

FOREIGN PATENT DOCUMENTS 898820 6/1962 United Kingdom .

OTHER PUBLICATIONS

"The Wonderful World of Pluronics Polyols" Library of Congress Catalog Card No. 70-150738.

*Primary Examiner*—Josephine Barr
*Attorney, Agent, or Firm*—Hosier, Niro & Daleiden

[57] ABSTRACT

A composition and method for controlling corrosion in aqueous systems with multiple metallurgies such as industrial cooling equipment is disclosed. The composition generally includes: (1) a triazole chosen from the group consisting of tolyltriazole and benzotriazole, (2) an aliphatic mono- or di-carboxylic acid having from 8-38 carbon atoms that is capable of controlling corrosion of mild steel, and (3) a nonionic wetting agent. In an alternate embodiment, the composition also includes a scale inhibitor chosen from the group consisting of polyol esters, 1-hydroxyethylidene-1,1-diphosphonic acid, amino tri(methylene phosphonic acid), and 2-phosphono-butane-tricarboxylic acid-1,2,4. The method of the invention entails the use of the above compositions in aqueous systems at dosage levels of at least 10 ppm.

20 Claims, No Drawings

COMPOSITION AND METHOD FOR CONTROLLING CORROSION IN AQUEOUS SYSTEMS

BACKGROUND OF THE INVENTION

The invention is directed generally to improved compositions and methods for preventing corrosion of metal surfaces coming into contact with water. More particularly, the invention is directed to improved compositions and methods for controlling corrosion in aqueous systems with multiple metallurgies in generally continuous contact with water. Industrial cooling systems including recirculating cooling towers and once-through heat exchange coolers represent typical such systems. In an important embodiment, the present invention is directed to a composition exhibiting outstanding corrosion control for mild steel maintained in generally continuous contact with water.

In most aqueous systems in which water is contained and through which water is moved, it is imperative that corrosion of metal surfaces contacting the water be controlled. Unchecked corrosion leads to premature failure of the system through erosion of system components and resultant corrosion penetration and stress failure.

Numerous chemical additives have been developed over the years for controlling corrosion of metals in aqueous systems. Typical such compounds include chromates, orthophosphate, nitrites, silicates, calcium carbonate, polyphosphonates, zinc and organic film-forming amines.

The use of these chemical corrosion inhibitors, however, presents a number of difficulties. Some of these inhibitors are toxic even at very low levels of concentration and are therefore barred from use in certain environments. Some of these compounds are uneconomical to use in high water volume applications such as industrial cooling systems. Perhaps most importantly, most of these inhibitors are specific for certain metallurgies and tend to operate at cross purposes when combined in a single composition or aqueous environment. Since multiple metallurgy equipment such as common industrial cooling systems requires the application of several different corrosion inhibitors, numerous difficulties arise due to physical and chemical interference between the different inhibitors.

Scaling is another problem of concern in systems in which metal surfaces are in generally continuous contact with water. Control of scale formation is of particular importance in recirculating cooling towers and in once-through heat exchange coolers utilizing high hardness water. In such systems scale tends to restrict water movement and heat exchange efficiency while accelerating the rate of metal corrosion. It is therefore important to control scaling, a task usually performed by a class of chemical compounds generally known as scale inhibitors. As might be anticipated, the introduction of scale inhibitors into aqueous systems already carrying multiple corrosion inhibitors will generally impair the effectiveness of all treatments present due to the multiplication of physical and chemical interaction between the different chemical compounds in the system.

Those skilled in the art therefore well recognize the need to develop compositions and methods capable of controlling corrosion in aqueous systems with multiple metallurgies in a safe, economic and efficient manner. If a further corrosion controlling composition and method utilizing scale inhibiting compounds which do not objectionably interfere with the action of the corrosion inhibitors could be developed, another important contribution to the art would be at hand.

It is an important object of the present invention to provide new compositions and methods employing these compositions which offer outstanding corrosion control in aqueous systems with multiple metallurgies.

It is a further object of the present invention to provide new compositions and methods which provide scale inhibition without significantly impairing corrosion control efficiency.

Yet another object of the present invention is to provide new highly efficient mild steel corrosion inhibiting compositions.

Other objects and features of the invention will become apparent upon examination of the following specification together with the claims. While the invention is described below in connection with preferred or illustrative embodiments, these embodiments are not intended to be exhaustive or limiting of the invention. Rather, the invention is intended to cover any alternatives, modifications and equivalents that may be included within its spirit and scope as defined by the appended claims.

SUMMARY OF THE INVENTION

In accordance with the present invention, it has now been found that corrosion can be controlled in aqueous systems with multiple metallurgies through the use of an aqueous composition containing:

(A) about 0.1–25% by weight of either tolyltriazole or benzotriazole;

(B) about 0.1–25% by weight of an aliphatic mono- or di- carboxylic acid having a straight chain, branched or cyclo- backbone of from 8–38 carbon atoms and being capable of controlling corrosion of mild steel; and, (C) about 0.1–20% by weight of a nonionic wetting agent.

The above composition may further include a scale inhibitor chosen from the group consisting of:

(1) scale inhibiting phosphate ester mixtures such as those formed by reacting glycerine with 2 moles of ethylene oxide per mole of glycerine, phosphating with phosphorus pentoxide and neutralizing with sodium hydroxide (see U.S. Pat. Nos. 3,886,205, 3,214,454, 3,933,427 and 3,728,420);

(2) 1-hydroxyethylidene-1,1-diphosphonic acid;

(3) amino tri(methylene phosphonic acid); and, (4) 2-phosphono-butane-tricarboxylic acid-1,2,4.

The triazole component of the present composition may be either tolyltriazole or benzotriazole, although tolyltriazole is preferred. In an alternate embodiment of the present invention, mercaptobenzothiazole may be substituted for the triazole. The level of triazole or thiazole may vary broadly within the range of from about 0.1–20% by weight of the overall composition, and preferably within the range of about 0.5–10% by weight. When the triazole is used it is preferred that the level of this component lie in the range of about 0.5–5.0% by weight.

A broad range of aliphatic mono- and di- carboxylic acids may be used in the present composition. These aliphatic acids which may be straight chain, branched or cyclo-compounds, must exhibit corrosion controlling capability with respect to mild steel. The carbon backbone of the aliphatic acids should contain from 8-38 carbon atoms and preferably will contain from 15-25 carbon atoms.

Among the above described aliphatic acids, the preferred acids are dicarboxylic cyclo-compounds. The most preferred dicarboxylic acid is a commercially available cycloaliphatic $C_{21}$ dicarboxylic acid described by the formula:

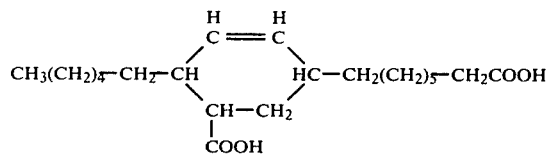

Other dicarboxylic acids believed to be useful in the present composition include sebacic, undecanedioic, dodecanedioic, tridecanedioic, tetradecanedioic and pentadecanedioic. Less preferred straight chain saturated fatty acids such as caprylic ($C_8$), pelargonic ($C_9$), capric ($C_{10}$), N-undecylic ($C_{11}$), lauric ($C_{12}$) through N-octatriacontoic ($C_{38}$) also may be used.

The level of fatty acid in the composition should range generally between about 0.1 and 25% by weight of the overall composition. When the above described cyclo-aliphatic $C_{21}$ dicarboxylic acid is used, the acid level should preferably range from about 0.5–10% by weight and most preferably the level of this compound will be about 1.0–5.0% by weight of the overall composition.

The composition of the present invention should also include a nonionic wetting agent, such as polyoxyalkylene glycol, a polyoxyalkylene glycol ether or a polyoxyalkylenepolyamine condensation product.

Particularly useful polyoxyalkylene glycols are polyoxypropylene glycol polymers having a molecular weight of from 1500–5000 which have been reacted with from 5–45% of ethylene oxide. Among these are block polymers of ethoxy chains and propoxy chains sold under the "PLURONIC" trademark. Most preferred among these "PLURONIC" surfactants are the "PLURONIC L-62" and "PLURONIC L-64" products which are polyoxypropylene glycol based molecules reacted respectively with 20% and 40% by weight of ethylene oxide to yield products with average respective molecular weights of 2500 and 2900. A further description of these materials as well as their method of preparation may be found in U.S. Pat. No. 2,674,619.

Polyoxyalkylene glycol ethers useful as nonionic wetting agents in the practice of the present invention include monoalkyl ethers of polyoxyalkylene glycol such as the compounds sold under the "UCON" trademark. These compounds have randomly distributed ethoxy and propoxy chains.

Polyoxyalkylene polyamine condensation products useful as wetting agents in the present invention are typified by the trademarked "TETRONIC" compounds. These compounds are condensation products of propylene oxide and ethylene oxide with polyamines. They may be prepared by condensing ethylenediamine or other diamines with propylene oxide to a pre-determined molecular weight of the order of 2000. The resulting compound is then reacted with ethylene oxide in the presence of sodium hydroxide to produce a block polymer.

The level of nonionic wetting agent present in the composition should range from about 0.1–20.0% by weight in the overall composition. It is preferred that the level be set at about 0.5–10.0% by weight and most preferable that it be set at about 0.1–5.0% by weight.

Formulation of a scale inhibiting composition in accordance with the present teaching is relatively straightforward due to the surprising compatibility of the components. Formulation should be carried out in an aqueous medium maintained at a pH of at least 7.0 with an alkaline agent such as sodium hydroxide, in order to prevent insolubilization of the aliphatic acid. A preferred composition according to the teaching of the present invention would contain the following components in the indicated percentages by weight:

| Compound | % By Weight |
| --- | --- |
| Soft water | 89.4 |
| Sodium hydroxide (50% aqueous) | 3.1 |
| Tolyltriazole | 2.0 |
| Cycloaliphatic dicarboxylic acid $C_{21}$ | 3.0 |
| PLURONIC L-62 | 2.5 |

Formulation may be carried out by: (1) charging the soft water to an appropriate vessel and initiating mixing; (2) charging the sodium hydroxide to the vessel; (3) adding the tolyltriazole while maintaining the mixture at about 50° C. preferably with the pH at a minimum of pH 10; and then, (5) adding the PLURONIC L-62 and mixing until all components are uniformly dispersed.

As noted earlier, the above composition is useful in controlling corrosion in aqueous systems with multiple metallurgies. It is particularly useful in controlling corrosion in typical industrial cooling systems containing mild steel, copper and admiralty. Data supporting this claim is set forth below in Example 1.

Useful maintenance dosages of at least 10 ppm of the present composition are required to obtain a useful degree of corrosion control in most systems. Preferable maintenance dosages will range from 50–500 ppm. In most systems, it will be helpful to introduce an initial slug dosage of from 4–10 times the maintenance dosage level for at least 2–3 days of operation of the system before falling back to the maintenance level.

The present composition is useful in systems operating over a wide pH range. Generally, the range envisioned will be from about pH 7.0 to pH 10.0. The present composition will be most useful in soft water systems. Use of this composition in this pH range in recirculating systems with water softeners or once-through systems using water with reasonably low hardness levels will result in a most satisfactory degree of corrosion control for mild steel, copper and admiralty surfaces.

Where particularly hard water is used or where control of corrosion in recirculating systems not employing water softening devices is desired, the present invention calls for the incorporation into the above composition of a scale inhibitor chosen from the group consisting of:

(1) scale inhibiting phosphate ester mixtures such as those formed by reacting glycerine with 2 moles of ethylene oxide per mole of glycerine, phosphating with phosphorus pentoxide and neutralizing with sodium hydroxide (see U.S. Pat. Nos. 3,886,205, 3,214,454, 3,933,427 and 3,728,420);

(2) 1-hydroxyethylidene-1,1-diphosphonic acid;

(3) amino tri(methylene phosphonic acid); and, (4) 2-phosphono-butane-tricarboxylic acid-1,2,4.

Most preferred among these scale inhibitors for present purposes are amino tri(methylene phosphonic acid), which is available commercially as the trademarked products "DEQUEST 2000" (Monsanto Chemical) and "FOSTEX U" (Textilana Chemical), and 2-phosphono-butane-tricarboxylic acid-1,2,4 which is available commercially as the trademarked product "PBSAM" (Bayer Chemical).

A scale/corrosion inhibiting composition according to the present invention would include in an aqueous medium at a pH of at least about 7.0 the following components in the indicated percentage ranges:

(A) about 0.1–25% by weight of tolyltriazole, benzotriazole or mercaptobenzothiazole, and preferably tolyltriazole;

(B) about 0.1–25% by weight of an aliphatic mono- or di- carboxylic acid having a straight chain, branched or cyclo- backbone of from 8–38 carbon atoms and being capable of controlling corrosion of mild steel;

(C) about 0.1–20% by weight of a nonionic wetting agent; and, (D) about 1.0–35% by weight of a scale inhibitor chosen from among:

(1) scale inhibiting phosphate ester mixtures such as those formed by reacting glycerine with 2 moles of ethylene oxide per mole of glycerine, phosphating with phosphorus pentoxide and neutralizing with sodium hydroxide (see U.S. Pat. Nos. 3,886,205, 3,214,454, 3,933,427 and 3,728,420);

(2) 1-hydroxyethylidene-1,1-diphosphonic acid;

(3) amino tri(methylene phosphonic acid); and, (4) 2-phosphono-butane-tricarboxylic acid-1,2,4.

In more preferred embodiments, components (A), (B) and (C) above will lie in the more restricted ranges set forth earlier for the scale inhibitor free composition. In its more preferred forms, component (D) of the above composition will range from about 2.0–20% by weight of the overall composition and most preferably it will range from 5.0–15% of the composition.

In a preferred embodiment of the above composition, a combination of amino tri(methylene phosphonic acid) and 2-phosphono-butane-tricarboxylic acid-1,2,4 may produce a scale inhibiting effect greater than the sum of their individual contributions (see U.S. Pat. No. 3,959,168). This dual scale inhibitor should contain the two scale inhibitors in a weight ratio of from about 1:4 to 4:1 and comprise from about 1–35%, and more preferably about 5.0–15% by weight of the overall composition.

A simple analytical method for monitoring dosage levels of the present corrosion and corrosion/scale inhibiting compositions may be provided by incorporating tracer ions in the overall compositions. The choice of such tracer materials is somewhat limited due to requirements for product compatability in the aqueous system being treated. In the present case, the $Cr+6$ ion was found to be particularly useful as a tracer. Since levels of the tracer ion may be very, very low, incorporation of this ion into the composition will not raise toxicity objections. Furthermore, the presence of this ion and its concentration as an indicator can be readily detected by known color comparitor methods such as those employed by the Hach or the LeMotte test kits. Furthermore, the $Cr+6$ ion may be readily introduced by adding sodium dichromate at the appropriate level to the overall corrosion and corrosion/scale inhibiting composition.

In yet another embodiment of the present invention, it has been discovered that the combination of the cycloaliphatic $C_{21}$ dicarboxylic acid described earlier with certain nonionic wetting agents in an aqueous medium constitutes a mild steel corrosion inhibitor with unexpectedly outstanding activity. The nonionic wetting agents utilized in this application are polyoxypropylene glycol based molecules reacted with from about 5–45% by weight of ethylene oxide to produce block copolymers with average molecular weights in the range of 1500–5000. This acid/wetting agent composition should contain from about 0.1–25% by weight of the cycloaliphatic acid and from 0.1–20% by weight of the nonionic wetting agent. An appropriate alkaline agent should also be included in order to maintain the pH of the mixture at above about pH 7.0 to prevent insolubilization of the cycloaliphatic acid. In a more preferable embodiment of this composition, the levels of acid and nonionic wetting agent will respectively lie in the ranges of about 0.5–15% by weight and 0.5–5.0% by weight. Dosages of this composition, when used to prevent corrosion in mild steel, should generally follow the teaching with respect to the multiple metallurgy treatments described earlier, including maintenance dosage levels of from about 50–500 ppm by weight and initial slug dosages of 4–10 times that amount.

EXAMPLES

Example 1

The effectiveness of the compositions of the present invention in controlling corrosion in mild steel, copper and admiralty was examined in a series of corrosion tests performed generally according to ASTM Method D 1384-70 (1975). These tests entailed suspending metal specimens in beakers containing 100 ppm by weight of the compositions to be tested in deionized water. A corrosive environment similar to that seen in heat exchange coolers was then obtained by bubbling air through the solutions at a rate of about 100 ml per minute for about 2 weeks. Corrosion of the specimens in terms of mils of penetration per year was determined, based upon the average weight change in each specimen at the end of the test period.

Four series of tests were run, one series with each of the compositions A, B and C listed below and one without treatment in order to establish a base line corrosion for each metallurgy.

| | % By Weight |
|---|---|
| Composition A | |
| Soft water | 54.1 |
| NaOH (50% aqueous) | 18.0 |
| 2-phosphono-butane-tricarboxylic acid-1,2,4 | 12.0 |
| Amino tri(methylene phosphonic acid) | 7.0 |
| Tolyltriazole | 2.0 |
| Cycloaliphatic $C_{21}$ dicarboxylic acid | 3.0 |
| Polyoxypropylene glycol block copolymer with 20% ethoxylation and molecular weight of about 2500 | 2.5 |
| Sodium dichromate | 1.4 |
| Composition B | |
| Soft Water | 89.4 |
| NaOH (50% aqueous) | 3.1 |
| Tolyltriazole | 2.0 |
| Cycloaliphatic $C_{21}$ dicarboxylic acid | 3.0 |
| Polyoxypropylene glycol block copolymer with 20% ethoxylation and molecular weight of about 2500 | 2.5 |
| Composition C | |
| Soft water | 88.1 |
| NaOH (50% aqueous) | 3.0 |
| Tolyltriazole | 2.0 |

-continued

| | % By Weight |
|---|---|
| Cycloaliphatic $C_{21}$ dicarboxylic acid | 3.0 |
| Polyoxypropylene glycol block copolymer with 20% ethoxylation and molecular weight of about 2500 | 2.5 |
| $Na_2Cr_2O_7 \cdot 2H_2O$ | 1.4 |

The corrosion results, in mils of penetration per year are reported in TABLE I below.

TABLE I

| | | CORROSION IN MPY | | |
|---|---|---|---|---|
| Treatment | pH | Admiralty | Copper | Mild Steel |
| No Treatment | 6.7 | 2.4 | 4.6 | 27.5 |
| (Baseline Corrosion) | 7.1 | 2.4 | 2.7 | 39.1 |
| | 7.7 | 3.3 | 4.2 | 53.1 |
| | 8.1 | 3.5 | 4.1 | 50.9 |
| Composition A | 6.7 | .79 | 1.73 | 33.6 |
| (100 ppm) | 7.1 | 1.10 | 2.20 | 43.5 |
| | 7.7 | 1.10 | 0.15 | 31.1 |
| | 8.1 | 1.30 | 1.30 | 18.9 |
| | 9.1 | 1.90 | 3.10 | 4.9 |
| Composition B | 6.4 | 0 | 0 | 21.21 |
| (100 ppm) | 7.6 | 0.16 | 1.1 | 47.44 |
| | 8.7 | 0.16 | 1.6 | 19.17 |
| | 9.1 | 0 | 0.47 | 9.74 |
| Composition C | 6.6 | 0.47 | 1.4 | 11.47 |
| (100 ppm) | 8.9 | 0 | 0 | 11.94 |
| | 9.2 | 0.16 | 0.79 | 8.48 |

Examination of the data in TABLE I will show that, in most cases, corrosion of the three metals tested was significantly reduced by treatment with compositions A, B and C. This data also indicates that corrosion control improved with increasing pH of the system.

Example 2

In the next series of tests, corrosion of mild steel in aqueous environments containing varying amounts of the components of the present composition was examined.

A rotating coupon test was employed in this example. In this test procedure a series of beakers was arranged with a gang-stirrer having stainless steel rods designed to suspend and rotate mild steel sandblasted and passivated coupons in the beakers. Passivation was accomplished by soaking the coupons over an 18 hour period in an aqueous solution of 1000 ppm by weight $NaNO_3$. The coupons were then suspended in beakers filled with aqueous solutions containing treatment compositions as set forth in TABLE II below. Rotation was set at about 136 rpm and temperature was set at about 100° F.

The makeup water in each beaker contained 10 parts Chicago tap water, 90 parts deionized water and 10 parts NaCl (to produce chloride ion). The chloride ion was utilized in order to simulate a corrosive environment. The rotating coupon test was carried out for a period of 24 hours after which the weight loss of the coupons was measured to determine the degree of corrosion of each coupon in mils of penetration per year. The results obtained are listed in TABLE II below.

TABLE II

| | | MILD STEEL CORROSION IN MPY | | | | |
|---|---|---|---|---|---|---|
| Test | Tolyltriazole (ppm) | $C_{21}$ Cycloaliphatic Dicarboxylic Acid (ppm) | Polyoxypropylene Glycol** | $CrO_4$ (ppm) | Initial pH | Corrosion (MPY) |
| 1 | 2 | — | — | — | 8.0 | 49.1 |
| 2 | — | 2 | — | — | 8.0 | 41.4 |
| 3 | — | — | 2.5 | — | 8.0 | 49.1 |
| 4 | — | — | — | 25 | 7.0 | 8.8 |
| 5 | 2 | — | — | — | 9.0 | 41.7 |
| 6 | — | 2 | — | — | 9.0 | 49.1 |
| 7 | — | — | 2.5 | — | 9.0 | 52.7 |
| 8 | 20 | 20 | 25 | — | 9.0 | 9.8 |
| 9 | 20 | 80 | 25 | — | 9.0 | 3.7 |
| 10 | 20 | 160 | 25 | — | 9.0 | 3.9 |
| 11 | 40 | 40 | 50 | — | 9.0 | 3.3 |
| 12 | 80 | 80 | 50 | — | 9.0 | 7.9 |
| 13 | 20 | 80 | 50 | — | 9.0 | 2.1 |
| 14 | 20 | 160 | 50 | — | 9.0 | 1.6 |
| 15 | 20 | 20 | 25 | — | 8.0 | 9.0 |
| 16 | 40 | 40 | 50 | — | 8.0 | 3.1 |
| 17 | 80 | 80 | 50 | — | 8.0 | 3.0 |
| 18 | 80 | 80 | 100 | — | 9.0 | 4.2 |
| 19 | — | 160 | 50 | — | 8.0 | 0.3 |
| 20* | — | 160 | 50 | — | 8.0 | 0 |
| 21* | — | 160 | 50 | — | 9.0 | 0.3 |
| 22* | 20 | 160 | 50 | — | 8.0 | 2.1 |
| 23 | 20 | 160 | 50 | — | 9.0 | 2.5 |
| 24 | — | 20 | 50 | — | 8.0 | 1.5 |
| 25 | — | 20 | 50 | — | 9.0 | 2.0 |
| 26 | 20 | 20 | 50 | — | 8.0 | 2.3 |
| 27 | 20 | 20 | 50 | — | 9.0 | 2.1 |
| 28 | 2 | 16 | 2.5 | — | 8.0 | 16 |
| 29 | 2 | 16 | 2.5 | — | 9.0 | 31 |
| 30 | — | — | — | 25 | 7.0 | 1.3 |
| 31 | — | — | — | — | 9.0 | 74.2 |
| 32 | — | — | — | — | 8.0 | 61.1 |
| 33 | — | — | — | — | 9.0 | 51.2 |
| 34 | — | — | — | — | 8.0 | 49.3 |
| 35* | — | — | — | — | 9.0 | 45.4 |
| 36* | — | — | — | — | 8.0 | 55.3 |

*Solution first adjusted to pH 10.5 with NaOH, then adjusted to desired pH with $H_2SO_4$.
**Block copolymer with 20% ethoxylation, molecular weight about 2500.

It readily can be seen from an examinaton of the data in TABLE II that significant reductions in mild steel corrosion can be obtained with compositions containing a combination of the $C_{21}$ cycloaliphatic dicarboxylic acid and the polyoxypropylene glycol block copolymer. While dicarboxylic acid alone or in combination with nitrites may be known as a corrosion inhibitor, the dosages required in these prior applications are on an order many times greater than those employed here. This data therefore demonstrates that the use of a nonionic wetting agent in combination with the dicarboxylic acid will produce a surprisingly enhanced corrosion control effect.

The data generated in this Example shows that when the tolyltriazole is combined with the dicarboxylic acid/wetting agent combination, mild steel corrosion control attributes of the overall composition are marginally reduced. This very limited degree of reduction in mild steel corrosion control demonstrates the compatibility of the tolyltriazole and the dicarboxylic acid in a composition for use in multiple metallurgy systems.

Example 3

Composition C of Example 1 which contained the chromate ion tracer was utilized in field trials with recirculating heat exchange systems to monitor the level of treatment composition. A good correlation was found between color intensity of the tracer ion and the level of product dosed to the system. It was also determined that this low level of chromium did not produce the undesirable side effect of pitting to copper, admiralty or steel tubes in the system.

In sum, the compositions and methods of the present invention represent an important contribution to the art of controlling corrosion of metals in aqueous systems, particularly systems with multiple metallurgies. The invention also has particular usefulness in controlling corrosion of mild steel. The present compositions are economical and efficient to use and are generally nontoxic. They are also generally free of the debilitating chemical and physical interaction seen in prior art combinations of corrosion inhibitors.

We claim:

1. A composition for controlling corrosion and scale formation in aqueous systems with multiple metallurgies comprising:
   about 0.1–25% by weight of a triazole chosen from the group consisting of tolyltriazone and benzotriazole;
   about 0.1–25% by weight of an aliphatic mono- or di- carboxylic acid having a straight chain, branched or cyclo-backbone of from 8–38 carbon atoms, said aliphatic mono- or di- carboxylic acid being capable of controlling corrosion of mild steel;
   about 0.1–20% by weight of a nonionic wetting agent chosen from the group consisting of polyoxyalkylene glycols, polyoxyalkylene glycol ethers and polyoxyalkylene-polyamine condensation products; and
   about 1.0–35% by weight of a scale inhibitor comprising a combination of amino tri(methylenephosphonic acid) and 2-phosphono-butane-tricarboxylic acid-1,2,4 in a weight ratio of from 1:4 to 4:1.

2. The composition of claim 1 where mercaptobenzothiazole is substituted for the triazole.

3. The composition of claim 1 where said aliphatic carboxylic acid is a cycloaliphatic dicarboxylic acid of from 9 to 21 carbon atoms.

4. The composition of claim 1 wherein said wetting agent is a polyoxyalkylene glycol having an average molecular weight of from about 2500 to 2900.

5. The composition of claim 4 where said polyoxyalkylene glycol is a polyoxypropylene glycol polymer of molecular weight from 1500–5000, said polymer being reacted with from 5–45% by weight of ethylene oxide.

6. The composition of claim 5 wherein said polyoxypropylene glycol has a molecular weight of 2500, said polyoxypropylene glycol being reacted with 20% ethylene oxide.

7. A method of controlling corrosion in aqueous systems with multiple metallurgies comprising treating the water contained and moving through the system with at least 10 ppm of a composition including between about 0.1 and 25% by weight of a triazole chosen from the group consisting of tolyltriazole and benzotriazole, between about 0.1 and 25% by weight of an aliphatic mono- or di- carboxylic acid having a straight chain, branched or cyclo-backbone of from 8–38 carbon atoms, said aliphatic mono- or di- carboxylic acid being capable of controlling corrosion of mild steel, between about 0.1 and 20% by weight of a nonionic wetting agent chosen from the group consisting of polyoxyalkylene glycols, polyoxyalkylene glycol ethers and polyoxyalkylene-polyamine condensation products; about 1.0–35% by weight of a scale inhibitor chosen from the group consisting of amino tri(methylenephosphonic acid) and 2-phosphono-butane-tricarboxylic acid-1,2,4; and sufficient alkaline agent to maintain the pH of the composition above about pH 7.0.

8. The method of claim 7 where said triazole is tolyltriazole.

9. The method of claim 7 where said carboxylic acid is a cycloaliphatic $C_{21}$ dicarboxylic acid of the formula:

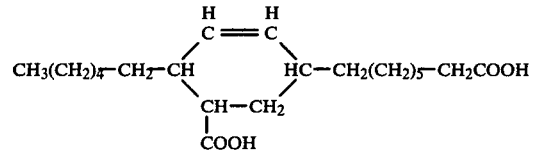

10. The method of claim 7 where said nonionic wetting agent is a polyoxypropylene glycol polymer of molecular weight from 1500–5000, said polymer being reacted with from 5–45% by weight of ethylene oxide.

11. A composition for controlling corrosion and scale formation in aqueous systems with multiple metallurgies comprising:
   about 0.1–25% by weight of a triazole chosen from the group consisting of tolyltriazole and benzotriazole;
   about 0.1–25% by weight of an aliphatic mono- or di- carboxylic acid having a straight chain, branched or cyclo-backbone of from 8–38 carbon atoms, said aliphatic mono- or di- carboxylic acid being capable of controlling corrosion of mild steel;
   about 0.1–20% by weight of a nonionic wetting agent chosen from the group consisting of polyoxyalkylene glycols, polyoxyalkylene glycol ethers and polyoxyalkylenepolyamine condensation products; and
   about 1.0–35% by weight of a scale inhibitor chosen from the group consisting of amino tri(methylenephosphonic acid) and 2-phosphono-butane-tricarboxylic acid-1,2,4.

12. The composition of claim 11 where the triazole is tolytriazole.

13. The composition of claim 12 where about 0.5 to about 10% of said tolyltriazole is used.

14. The composition of claim 1 where said carboxylic acid has from about 15 to about 25 carbon atoms.

15. The method of claim 7 where said carboxylic acid is a cycloaliphatic $C_{21}$ dicarboxylic acid of the formula

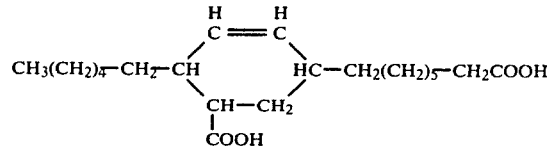

16. The composition of claim 11 wherein said wetting agent is a polyoxypropylene glycol polymer of molecular weight from 1500–5000, said polymer being reacted with from 5–45% by weight of ethylene oxide.

17. The composition of claim 11 wherein said scale inhibitor is amino tri(methylenephosphonic acid).

18. The composition of claim 11 wherein the scale inhibitor is 2-phosphono-butane-tricarboxylic acid-1,2,4.

19. The composition of claim 11 wherein said scale inhibitor comprises a combination of amino tri(methylenephosphonic acid) and 2-phosphono-butane-tricarboxylic acid-1,2,4 in a weight ratio of from 1:4 to 4:1.

20. The method of claim 7 wherein said scale inhibitor comprises a combination of amino tri(methylenephosphonic acid) and 2-phosphono-butane-tricarboxylic acid-1,2,4 in a weight ratio of from 1:4 to 4:1.

* * * * *